United States Patent [19]
Joelson

[11] 4,444,090
[45] Apr. 24, 1984

[54] GOVERNING MEANS FOR A HYDRAULIC ACTUATOR

[76] Inventor: Karl E. Joelson, Poststrasse 3 C, Klecken, Rosengarten, Fed. Rep. of Germany, DE 2107

[21] Appl. No.: 329,820

[22] Filed: Dec. 11, 1981

[30] Foreign Application Priority Data

Dec. 16, 1980 [SE] Sweden ............................ 8008827

[51] Int. Cl.³ ........................ F15B 9/10; F15B 9/03; F15B 9/09
[52] U.S. Cl. .................................. 91/363 R; 91/383; 91/465; 251/11
[58] Field of Search ............. 60/528; 251/11; 91/419, 91/383, 361, 36 RR, 363 A, 465

[56] References Cited

U.S. PATENT DOCUMENTS

| | | | |
|---|---|---|---|
| 2,570,624 | 10/1951 | Wyckoff | 91/383 |
| 4,121,504 | 10/1978 | Nowak | 91/383 |
| 4,219,181 | 8/1980 | Joelson | 60/528 |

FOREIGN PATENT DOCUMENTS

| | | |
|---|---|---|
| 182402 | 1/1963 | Sweden. |
| 359621 | 3/1970 | Sweden. |
| 406631 | 2/1979 | Sweden. |

Primary Examiner—Paul E. Maslousky
Attorney, Agent, or Firm—Cantor and Lessler

[57] ABSTRACT

In a hydraulic piston actuator the supply of working fluid is governed by at least one servo valve of the three-gate type, the spring-loaded valve body of which is activated by a thermowire adapted normally to hold the valve body in a position to close-off the supply of fluid. One end of the thermowire is connected to a compensating device, goverened by the movement of the actuator piston in such a manner that thermal movements are partly counteracted. The servo valve may actuate a maximum switch, and a time relay will, after a predetermined period of time put the fluid pump out of action, and connect both sides of a double acting actuator with a return flow tank.

7 Claims, 1 Drawing Figure

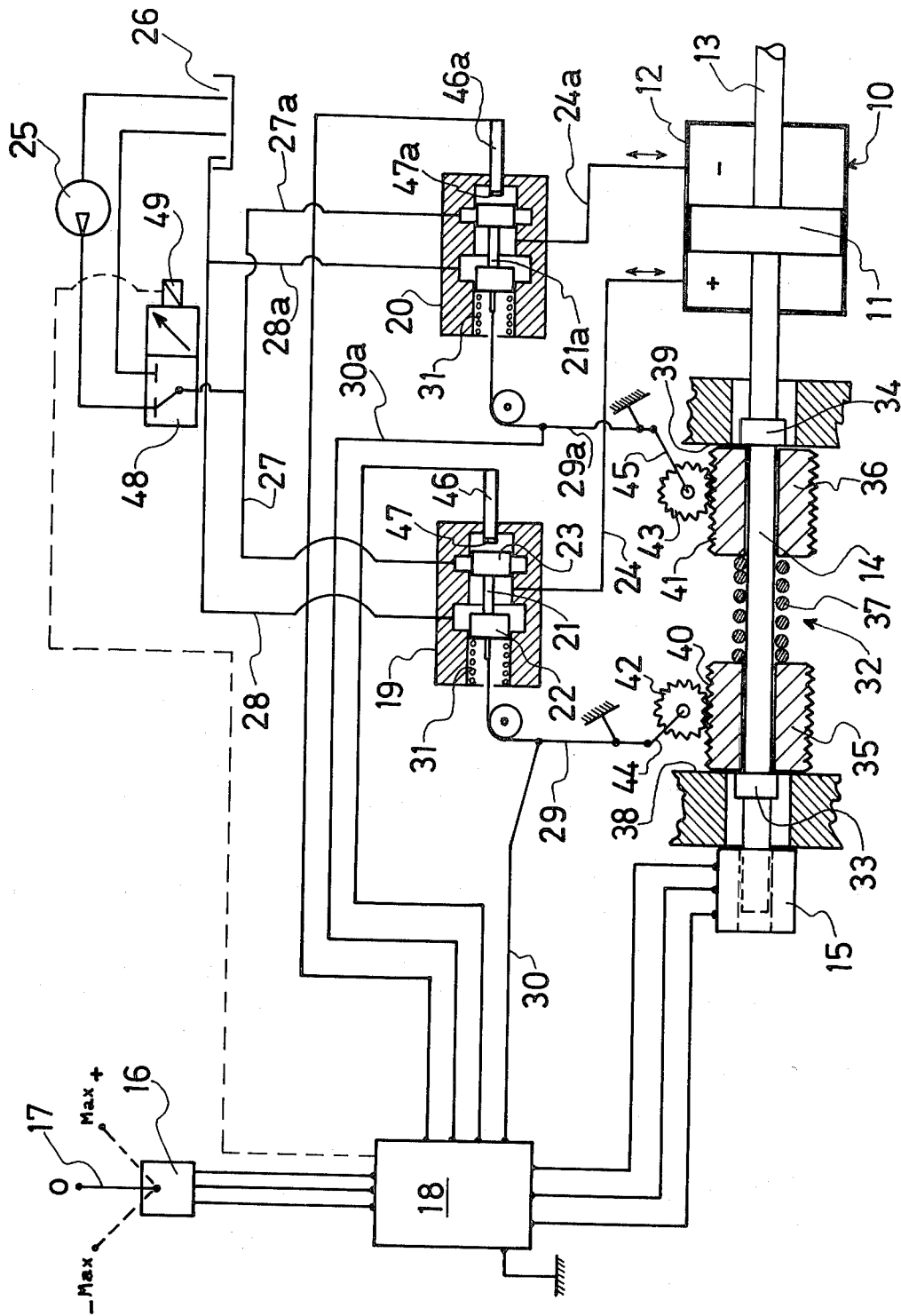

4,444,090

GOVERNING MEANS FOR A HYDRAULIC ACTUATOR

BACKGROUND OF THE INVENTION

The inventor has, in his U.S. Pat. No. 4,219,181 described a device for governing a hydraulic actuator by means of an electrically heated wire (a thermowire), which activates a servo valve controlling the supply of working fluid. Experience has shown that it is difficult rapidly to combine a nominal value signal and an actual value signal into a signal ensuring a suitable heating of the wire. This will cause an undesirable instability at the piston of the actuator, which may have a detrimental influence upon the performance of the actuator.

The aim of the present invention is to propose a governing means, which rapidly and accurately adjusts the position of the piston of the actuator, as described, and which will bring about this adjustment with a low consumption of working fluid.

SUMMARY OF THE INVENTION

The invention refers to a piston actuator, in which governing signals are transferred to an electrically heated wire (a thermowire), which in turn adjusts a servo device, and is characterized in means connected to an extension of the piston rod of the actuator and adapted to transfer to the thermowire a feed-back movement for compensating the movement of the wire caused by the heating.

The servo device is preferably a three-gate valve, in which the thermowire and a spring normally holds the valve body in a position permitting return flow from the actuator to a storage tank. The valve body is preferably a cylindrical slide having two lands, and the valve lacks fixed throttling means.

The valve body may be provided with means for actuating a maximum switch and the means activating the thermowire preferably comprises a relay or corresponding component, which after a predetermined period of time at closed maximum switch operates a valve, which puts the servofluid pump out of action and also connects both sides (+, −) of the piston actuator with the return flow tank.

The hydraulic actuator may be single acting, in which case a return movement is caused for instance by a spring, but on many occasions a double acting actuator is preferred. In such case a servo valve is connected to each side of the hydraulic actuator, each valve being operated by a thermowire, individually connected to a compensating device.

A resetting means at the hydraulic actuator preferably comprises two bodies, slidingly mounted upon a rod displaceable by the actuator, which by an interposed spring are forced towards end stops, and each body is adapted to cooperate with means forming attachment for one end of the thermowire.

BRIEF DESCRIPTION OF THE DRAWING

The single drawing schematically shows a governing means according to the invention for controlling a double-acting hydraulic actuator, which is connectable to a load (not shown) for causing changes of position thereof.

DESCRIPTION OF A PREFERRED EMBODIMENT

A hydraulic actuator is generally denoted by 10, and is provided with a piston 11, which is reciprocatedly fitted in a cylinder 12. One end of the piston rod 13 is connected to the load (not shown), which is to be actuated, for instance a lever, or the like, which must be swung. An extension 14 of the opposite end of the piston rod operates a transmitter 15 issuing actual position signals. The transmitter may include a variable electric resistance, an inductive device, or some other suitable electric component.

A transmitter for nominal value position signals is denoted by reference 16 and is operable by a lever 17 to cause displacement of the piston in actuator 10 in either of two directions (+, −). This transmitter may be substituted by outputs from a computer.

The nominal and actual signal transmitters 15 and 16 issue signals to an electronic device 18 containing comparators of known type, and which is the actual activating means for two servo valves 19, 20, which each controls one side (+ or −) at the hydraulic actuator 10.

Each servo valve 19, 20 is a three-gate valve, and includes a cylindrical slide 21 having two lands 22, 23. One gate, between the lands, is by way of a conduit 24, 24a connected to one side (+ or −) of the cylinder of the actuator 10.

A pump 25 draws hydraulic fluid from a tank 26, and supplies fluid to the servo valves 19, 20 by way of conduits 27, 27a. Return flow conduits 28, 28a transfer possible effluent from the servo valves back to the tank 26.

Each valve slide 21 is connected to one end of a wire 29, 29a of a material having marked heat expansion properties (a thermowire). The other end of the wire is connected to a compensating device, which will be described more in detail below. Each thermowire 29, 29a is, by way of a lead 30, 30a, connected to the electronic unit 18, which is adapted, on an occasion of activation, to transfer a pulsating current to the wire, the current being a function of the difference between nominal and actual position value signals. It is evident that a heating, or a cooling, respectively, of the thermowire will cause a displacement of the associated valve slide 21, 21a.

Each valve slide is biased by a spring 31, the arrangement being made to retain the associated valve slide in a position, where the land 22 holds the return flow conduit to the tank open, while land 23 closes the supply conduit from pump 25.

A heating, and a consequential elongation of a thermowire permits the spring 31 to push the associated valve slide 21 (21a) sufficient to close the return flow, while simultaneously opening the supply. The servo valves do not have any fixed throttling means, and the desired displacement of the piston of actuator 10 is brought about by a minimum expenditure of working fluid.

The drawing shows a comparatively short wire, but in a practical embodiment it may be advantageous to use a rather long wire which is wound upon a carrier.

It may be difficult to determine the amount of heating current exactly. The initial movement of the piston 11 may easily become too big, which will require an adjustment backwards. Under unfavourable conditions a marked instability around the nominal position may occur, which means an increased consumption of working fluid. In order to reduce such undesirable movements a compensating device, generally denoted by 32, is provided at the extended portion 14 of the actuator piston rod.

The rod portion 14 is provided with two abutments 33, 34, and upon the rod two bodies 35, 36 are slidably mounted. A compression spring 37 forces the bodies away from each other, but the movements of the bodies are limited by fixed end stops 38, 39 in guides, through which the rod portion 14 passes.

Each body 35, 36 is provided with a rack-shaped surface 40, 41, which each cooperates with a pinion 42, 43. A lever 44, 45 is attached to each pinion 42, 43, and one end of a thermowire, 29 or 29a respectively, is connected to each lever. It is evident that a rotation of any of the pinions 42, 43, depending upon the direction of displacement of the cooperating body 35, 36, will cause a tightening or a slackening, respectively, of the associated thermowire 29, 29a.

The device acts in the following manner. It is presupposed that a heating current, by way of lead 30, is supplied to the thermowire 29 at servo valve 19. The thermo valve will be elongated and the associated slide 21 is displaced towards the right in the drawing. Working fluid may then pass to the plus side of the actuator 10, whereby its piston 11 will be displaced to the right in the drawing. The minus side of the actuator will remain connected to tank 26 by way of the valve 20, which is not activated.

When the piston moves, rod portion 14 moves with it towards the right, and abutment 33 displaces body 35 towards the right. This means that pinion 42 is rotated anti-clockwise and stretches wire 29, so part of the elongation caused by the heating is counteracted. Hereby the fluid supply to actuator 10 will be smoother and its piston 11 will rapidly and without any oscillations reach the desired position.

The body 36 will rest against its end stop 39, and will not be influenced by movement of rod portion 14. When the supply of current to the wire 29 ceases the wire will rapidly cool down, and contracts for repositioning of slide 21. Also on this occasion the compensating device will act, however in the opposite direction. It should be noted that the compensating movement corresponds to a minor part, say 10%, of the movement of the main piston, so it is in no way sufficient to operate the servo valve.

An insulated rod member 46, 46a extends into the housing of each slide 21, 21a, and carries at its inward end a contact 47, 47a of a maximum switch. This may momentarily short-circuit the associated lead 30, 30a should the supply of current be too high. The latter would make the thermowire release the slide to its bottom position, corresponding to fully open fluid supply. The switch will cause short interruption pulses, which will distribute the fluid supply over an extended period.

The arrangement may also be used for safety reasons, in case one of the wires should break.

A valve 48 is fitted in the pressure conduit from the pump 25, this valve being governed by a solenoid 49. Normally this valve rests in a position permitting supply of fluid to both servo valves 19, 20. The electronic unit 18 contains a relay, or a memory, which is adapted to activate the solenoid 49 after a predetermined time, should the maximum switch 47, 47a remain closed, so valve 48 is moved. The pump will then be cut-off from the servo valves, and both supply gates will be connected to tank 26.

If a thermowire breaks the associated valve will be permanently displaced to its end position by its spring, and the actuator 10 will be supplied with an undesired amount of fluid. Its piston 11 and one of the compensator bodies 35, 36 will be moved to an end position, in which they remain during the short period of time required by the time relay in the electronic unit 18 to react, and to shift valve 48. As soon as this occurs the (normal) pressure sides of the servo valves will communicate with the tank 26, and the spring 37 in the compensating device will bring the piston 11 back to its neutral position.

The embodiment described above and illustrated in the drawing is an example only, where the components, within the scope of the appended claims, may be varied and augmented in many ways, as known in this field of the art to meet further control and safety requirements, and depending upon the performance expected of the actuator. It is thus possible to fit a valve, for instance a solenoid valve, between the supply conduits 24 and 24a. This valve is normally closed, but is connected to lever 17, so it will be opened when the lever is brought into its neutral position. The open valve will prevent any undesired movement of the actuator, should part of the hydraulic system accidentally be supplied with pressurized fluid.

The drawing shows a double-acting actuator, but as mentioned above, the invention may also be used with single-acting actuators. The servo valve 19 will then, as described above, govern the supply of working fluid to the plus chamber of the actuator, so a carefully controlled displacement of the piston is obtained, while a return movement thereof is caused, for instance by a compression spring enclosed in the minus chamber, or by the load itself, these serving as substitutes for valve 20 and associated conduits.

What I claim is:

1. Governing means for a hydraulic actuator of the type which has a piston having a piston rod passing into a cylinder and supplied with working fluid from a source of pressurized fluid, and comprising:
   (A) at least one fluid control means in conduitry between said pressure fluid source and said cylinder,
   (B) an arbitrarily adjustable, nominal position signal transmitter and an actual position signal transmitter operable by said piston rod,
   (C) an electric resistance wire operatively connected to said fluid control means and means to activates said wire,
   (D) said activating means comparing nominal position signals and actual position signals and issuing a signal for determining the supply of electric current to said electric resistance wire, and
   (E) compensating means operable by said piston rod and adapted to transfer to said electric resistance wire a feed-back movement partly counteracting thermal movement thereof caused by said activating means.

2. The governing means according to claim 1, in which said fluid control means is a three-gate valve having a body, in which said electric resistance wire and a spring load normally hold the valve body in a position permitting return flow from said actuator to a storage tank at said source of pressure fluid.

3. The governing means according to claim 2, in which said valve body is a cylindrical slide having two lands.

4. The governing means according to claim 2, in which said valve body is provided with means for actuating a maximum switch.

5. The governing means according to claim 4, in which said maximum switch comprises a relay, which after a predetermined period of time during which said maximum switch remains closed, operates a valve in said conduitry, which puts said source of pressure fluid out of communication with said actuator and connects both sides (+, −) of said actuator with said storage tank.

6. The governing means according to claim 2 as used with a double acting hydraulic actuator, in which a servo valve is connected to each side (+, −) of said actuator, and in which an electric resistance wire connected to each of said servo valves is individually connected to said activating means.

7. The governing means according to claim 6, in which said compensating means at said actuator comprises two bodies, slidingly mounted upon an extended portion of said piston rod and a spring interposed between said bodies for forcing them towards end stops, each body being adapted to cooperate with means forming attachment for one end of an associated electric resistance wire.

* * * * *